United States Patent
Yamamoto

(10) Patent No.: US 9,645,776 B2
(45) Date of Patent: May 9, 2017

(54) PRINTING SYSTEM, PRINTER, AND INFORMATION PROCESSING APPARATUS

(71) Applicant: BROTHER KOGYO KABUSHIKI KAISHA, Nagoya, Aichi (JP)

(72) Inventor: Hiroyuki Yamamoto, Kasugai (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/955,152

(22) Filed: Dec. 1, 2015

(65) Prior Publication Data

US 2016/0154615 A1    Jun. 2, 2016

(30) Foreign Application Priority Data

Dec. 1, 2014    (JP) .................. 2014-242752

(51) Int. Cl.
*H04N 1/04*    (2006.01)
*G06F 3/12*    (2006.01)

(52) U.S. Cl.
CPC .......... *G06F 3/1222* (2013.01); *G06F 3/1238* (2013.01); *G06F 3/1285* (2013.01)

(58) Field of Classification Search
CPC ..... G06F 3/1222; G06F 3/1238; G06F 3/1285
USPC .............................. 358/1.14, 1.15, 1.13, 1.9
See application file for complete search history.

(56) References Cited

U.S. PATENT DOCUMENTS

2009/0190166 A1* 7/2009 Nakamura ............ G06F 3/1219
358/1.15
2009/0213411 A1* 8/2009 Fukumi ................. G06F 21/608
358/1.14
2010/0208298 A1* 8/2010 Kitagata ............... G06F 3/1207
358/1.15
2010/0265531 A1    10/2010 Nitta
2011/0302637 A1* 12/2011 Hamada ................ G06F 3/1204
726/5
2013/0176595 A1* 7/2013 Yamada ................ G06F 3/1222
358/1.16

(Continued)

FOREIGN PATENT DOCUMENTS

JP    2006-293933 A    10/2006
JP    2010-250631 A    11/2010

*Primary Examiner* — Houshang Safaipour
(74) *Attorney, Agent, or Firm* — Scully, Scott, Murphy & Presser, PC

(57) ABSTRACT

A printing system including a printer and an information processing apparatus, the printer being configured to receive image data from the information processing apparatus, store the image data, generate image identification information identifying the image data, and transmit the image identification information to the information processing apparatus, the information processing apparatus being configured to store the received image identification information in association with an information-processor user ID, and transmit an inquiry about a login user to the printer, the printer returning a printer user ID of the login user to the information processing apparatus, the information processing apparatus transmitting to the printer a print command and the image data stored in association with the information-processor user ID when the received printer user ID is coincident with the stored information-processor user ID, the printer performing a printing operation based on the received image data.

14 Claims, 11 Drawing Sheets

(56) References Cited

U.S. PATENT DOCUMENTS

2014/0036297 A1* 2/2014 Arai ................ G06K 15/4095
358/1.14
2015/0002882 A1* 1/2015 Nakajima ............ G06F 3/1218
358/1.14

* cited by examiner

PRINTING SYSTEM, PRINTER, AND INFORMATION PROCESSING APPARATUS

CROSS-REFERENCE TO RELATED APPLICATION

This application claims priority under 35 U.S.C. §119 from Japanese Patent Application No. 2014-242752 filed on Dec. 1, 2014. The entire subject matter of the application is incorporated herein by reference.

BACKGROUND

Technical Field

The following description relates to a printing system including a printer and an information processing apparatus, more particularly to one or more techniques regarding a printing system in which, in response to successfully performing user authentication, a printer begins to perform a printing operation based on print data received from an information processing apparatus.

Related Art

A printing system has been known that includes a printer and an information processing apparatus and is configured such that, in response to successfully performing user authentication, the printer begins to perform a printing operation based on print data received from the information processing apparatus.

In an example of the known printing system, a host device generates print data corresponding to confidential data, and further generates a job ticket containing coded information such as a user ID and a password. Then, the host device transmits the job ticket to a printer, and is on standby waiting for a request for transmission of the print data from the printer. Then, in response to successfully performing user authentication, the printer transmits a request for transmission of the print data to the host device, and begins to perform a printing operation based on the print data received from the host device.

SUMMARY

However, the known printing system has the following problem. That is, in the printing system, the host device generates the job ticket containing the user ID and the password and transmits the job ticket to the printer. Therefore, there might be a risk of leakage of the password.

Aspects of the present disclosure are advantageous to provide one or more improved techniques to achieve a high-security printing system in which a printer begins to perform a printing operation based on print data received from an information processing apparatus in response to successful user authentication.

According to aspects of the present disclosure, a printing system is provided, which includes a printer, and an information processing apparatus that includes an information-processor-side operation unit, an information-processor-side communication unit, an information-processor-side storage, an information-processor-side controller configured to perform an acceptance process including acquiring an information-processor user ID, accepting a print instruction via the information-processor-side operation unit, the print instruction including image data, the print instruction instructing the information processing apparatus to cause the printer to perform a printing operation based on the image data included in the print instruction, transmitting the image data included in the print instruction to the printer via the information-processor-side communication unit, receiving image identification information from the printer via the information-processor-side communication unit, the image identification information being returned by the printer in response to the printer receiving the image data from the information processing apparatus, the image identification information identifying the image data, and in response to receipt of the image identification information, storing, into the information-processor-side storage, the received image identification information in association with the acquired information-processor user ID, and after transmitting the image data and receiving the image identification data, perform a user confirmation process including transmitting a reply request to the printer via the information-processor-side communication unit, the reply request requesting the printer to return to the information processing apparatus a printer user ID of a user who is logging in to the printer, in response to receipt of the printer user ID from the printer, determining whether the received printer user ID is coincident with the information-processor user ID stored in the information-processor-side storage, and when determining that the received printer user ID is coincident with the information-processor user ID stored in the information-processor-side storage, transmitting a print command and the image identification information that is stored in the information-processor-side storage in association with the information-processor user ID coincident with the printer user ID, to the printer via the information-processor-side communication unit, the print command instructing the printer to perform the printing operation based on the image data identified by the image identification information associated with the information-processor user ID coincident with the printer user ID, the printer including a printing unit, a printer-side operation unit, a printer-side communication unit, a printer-side storage, and a printer-side controller configured to perform a print data receiving process including receiving the image data from the information processing apparatus via the printer-side communication unit, generating the image identification information identifying the received image data, storing, into the printer-side storage, the received image data in association with the generated image identification information, and transmitting the generated image identification information to the information processing apparatus via the printer-side communication unit, after receiving the image data and transmitting the image identification information, perform a printer-side login process including accepting authentication information via the printer-side operation unit, the authentication information including the printer user ID, performing user authentication based on the accepted authentication information, and permitting the user identified by the printer user ID to log in to the printer when successfully performing the user authentication, and not permitting the user identified by the printer user ID to log in to the printer when not successfully performing the user authentication, perform a reply process including receiving the reply request from the information processing apparatus via the printer-side communication unit, the reply request requesting the printer to return to the information processing apparatus the printer user ID of the user who is logging in to the printer, and in response to receipt of the reply request, returning the printer user ID included in the authentication information used for the successful user authentication, to the information processing apparatus via the printer-side communication unit, and after returning the print user ID used for the successful user authentication, perform a print process including receiving the print command and the image identification information from the information processing apparatus via the printer-side communication unit, the print command instructing the printer to perform the printing operation based on the image data associated with the image identification information, in response to receipt of the print command and the image identification information, determining whether the image data associated with the received image identification information is stored in the printer-side storage, and when determining that the image data associated with the received image identification information is stored in the printer-side storage, controlling the printing unit to perform the printing operation based on the image data associated with the received image identification information.

According to aspects of the present disclosure, further provided is a printer including a printing unit, an operation unit, a communication unit configured to communicate with an information processing apparatus, a storage, and a controller configured to perform a print data receiving process including receiving image data from the information processing apparatus via the communication unit, generating image identification information identifying the received image data, storing, into the storage, the received image data in association with the generated image identification information, and transmitting the generated image identification information to the information processing apparatus via the communication unit, after receiving the image data and transmitting the image identification information, perform a login process including accepting authentication information via the operation unit, the authentication information including printer user ID, performing user authentication based on the accepted authentication information, and permitting a user identified by the printer user ID to log in to the printer when successfully performing the user authentication, and not permitting the user identified by the printer user ID to log in to the printer when not successfully performing the user authentication, perform a reply process including receiving a reply request from the information processing apparatus via the communication unit, the reply request requesting the printer to return to the information processing apparatus the printer user ID of the user who is logging in to the printer, and in response to receipt of the reply request, returning the printer user ID included in the authentication information used for the successful user authentication, to the information processing apparatus via the communication unit, and after returning the print user ID used for the successful user authentication, perform a print process including receiving a print command and the image identification information from the information processing apparatus via the communication unit, the print command instructing the printer to perform the printing operation based on the image data associated with the image identification information, in response to receipt of the print command and the image identification information, determining whether the image data associated with the received image identification information is stored in the storage, and when determining that the image data associated with the received image identification information is stored in the storage, controlling the printing unit to perform the printing operation based on the image data associated with the received image identification information.

According to aspects of the present disclosure, further provided is an information processing apparatus including an operation unit, a communication unit configured to communicate with a printer, a storage, a controller configured to perform an acceptance process including acquiring an information-processor user ID, accepting a print instruction via the operation unit, the print instruction including image data, the print instruction instructing the information processing apparatus to cause the printer to perform a printing operation based on the image data included in the print instruction, transmitting the image data included in the print instruction to the printer via the communication unit, receiving image identification information from the printer via the communication unit, the image identification information being returned by the printer in response to the printer receiving the image data from the information processing apparatus, the image identification information identifying the image data, and in response to receipt of the image identification information, storing, into the storage, the received image identification information in association with the acquired information-processor user ID, and after transmitting the image data and receiving the image identification data, perform a user confirmation process including transmitting a reply request to the printer via the communication unit, the reply request requesting the printer to return to the information processing apparatus a printer user ID of a user who is logging in to the printer, in response to receipt of the printer user ID from the printer, determining whether the received printer user ID is coincident with the information-processor user ID stored in the storage, and when determining that the received printer user ID is coincident with the information-processor user ID stored in the storage, transmitting a print command and the image identification information that is stored in the storage in association with the information-processor user ID coincident with the printer user ID, to the printer via the communication unit, the print command instructing the printer to perform the printing operation based on the image data identified by the image identification information associated with the information-processor user ID coincident with the printer user ID.

BRIEF DESCRIPTION OF THE ACCOMPANYING DRAWINGS

Figure 3:
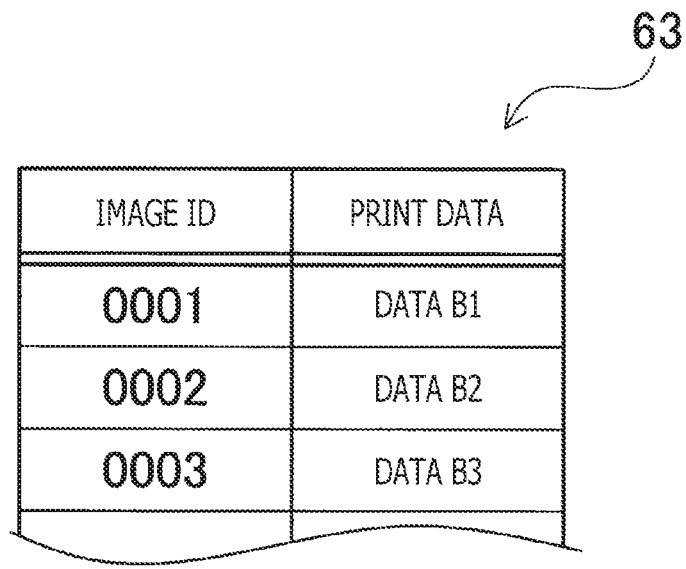

FIG. 3 exemplifies a print data list stored in a printer included in the printing system in the illustrative embodiment according to one or more aspects of the present disclosure.

Figure 4:
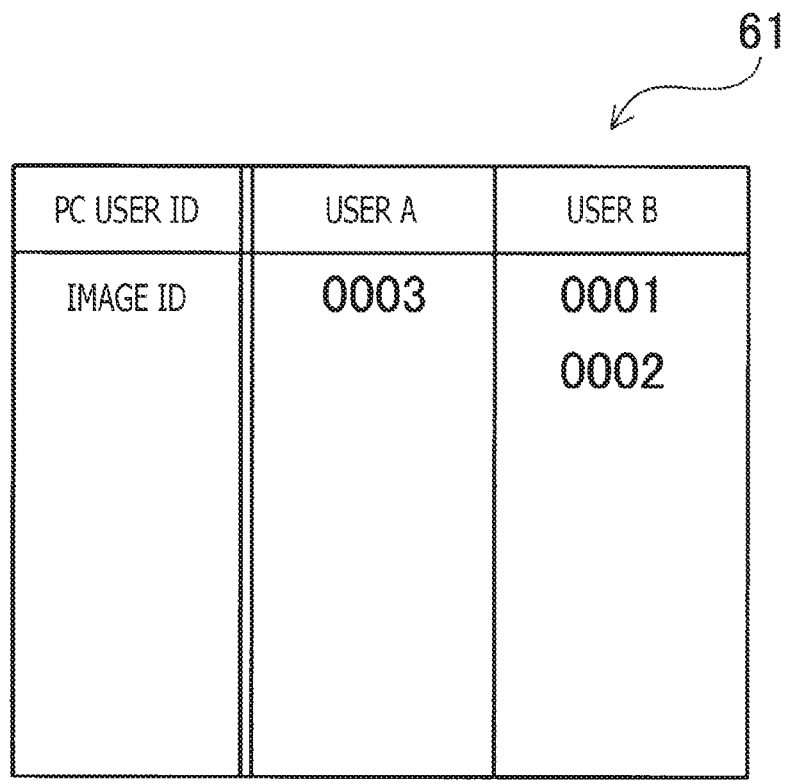

FIG. 4 exemplifies an image ID list stored in a personal computer (hereinafter, which may be referred to as "PC") included in the printing system in the illustrative embodiment according to one or more aspects of the present disclosure.

Figure 5:
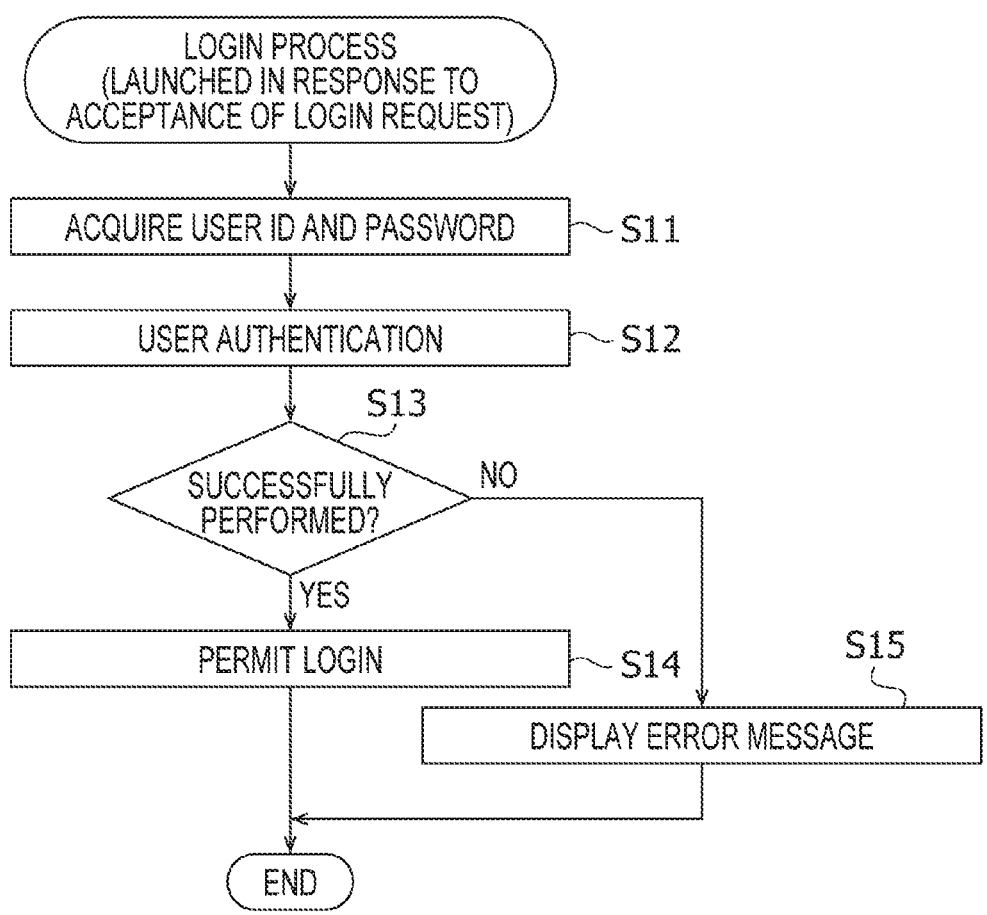

FIG. 5 is a flowchart showing a procedure of a login process to be executed by a CPU (a controller) of the printer in the illustrative embodiment according to one or more aspects of the present disclosure.

Figure 6:
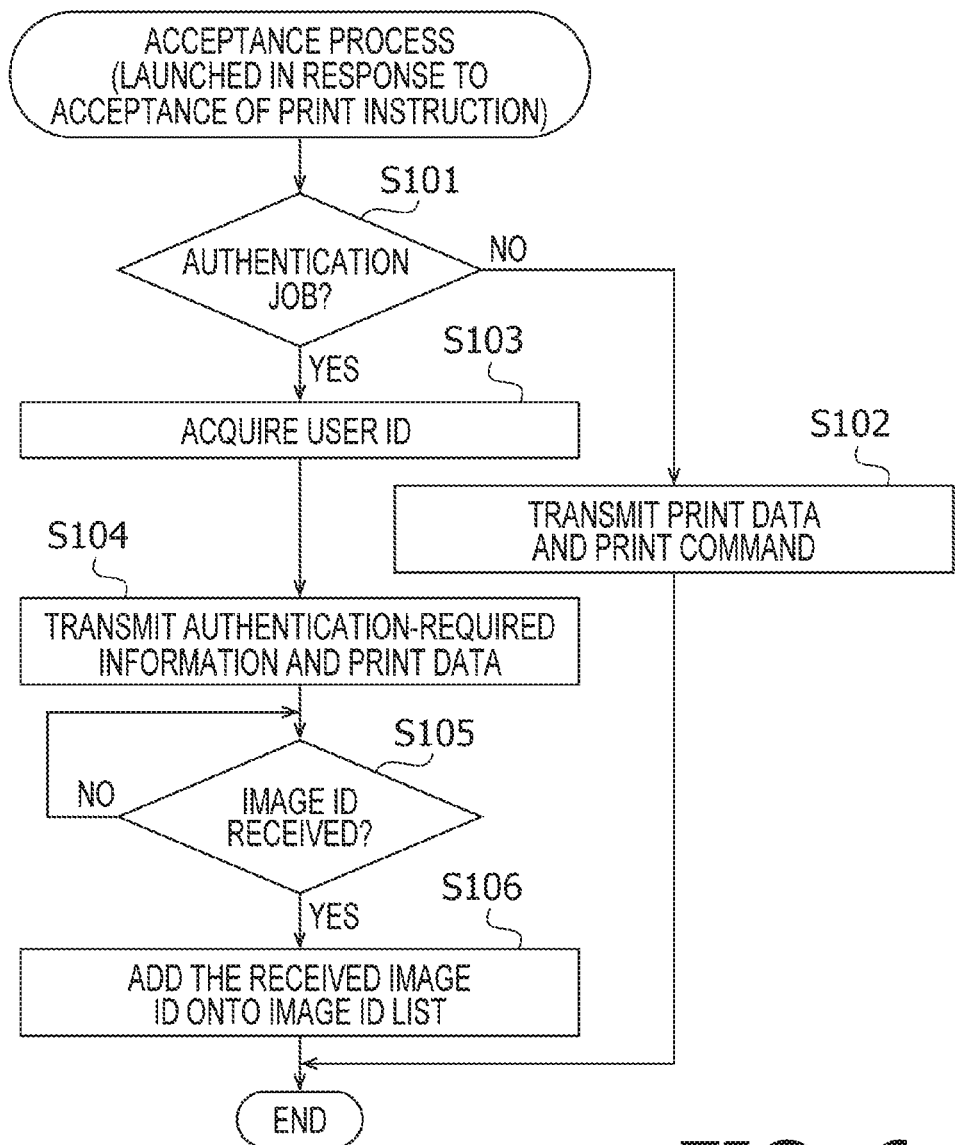

FIG. 6 is a flowchart showing a procedure of an acceptance process to be executed by a CPU of the PC in the illustrative embodiment according to one or more aspects of the present disclosure.

Figure 7:
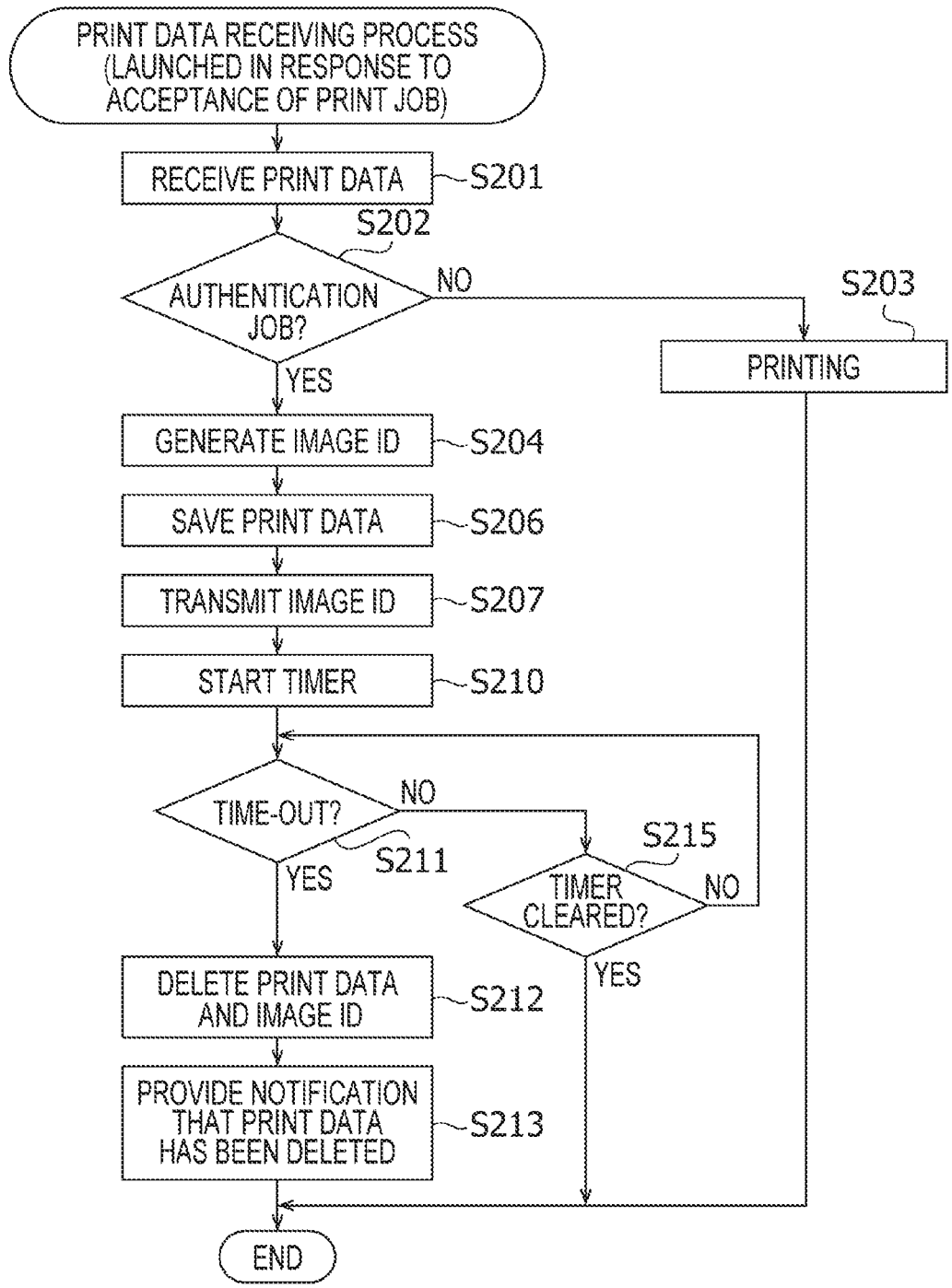

FIG. 7 is a flowchart showing a procedure of a print data receiving process to be executed by the CPU (the controller) of the printer in the illustrative embodiment according to one or more aspects of the present disclosure.

Figure 8:
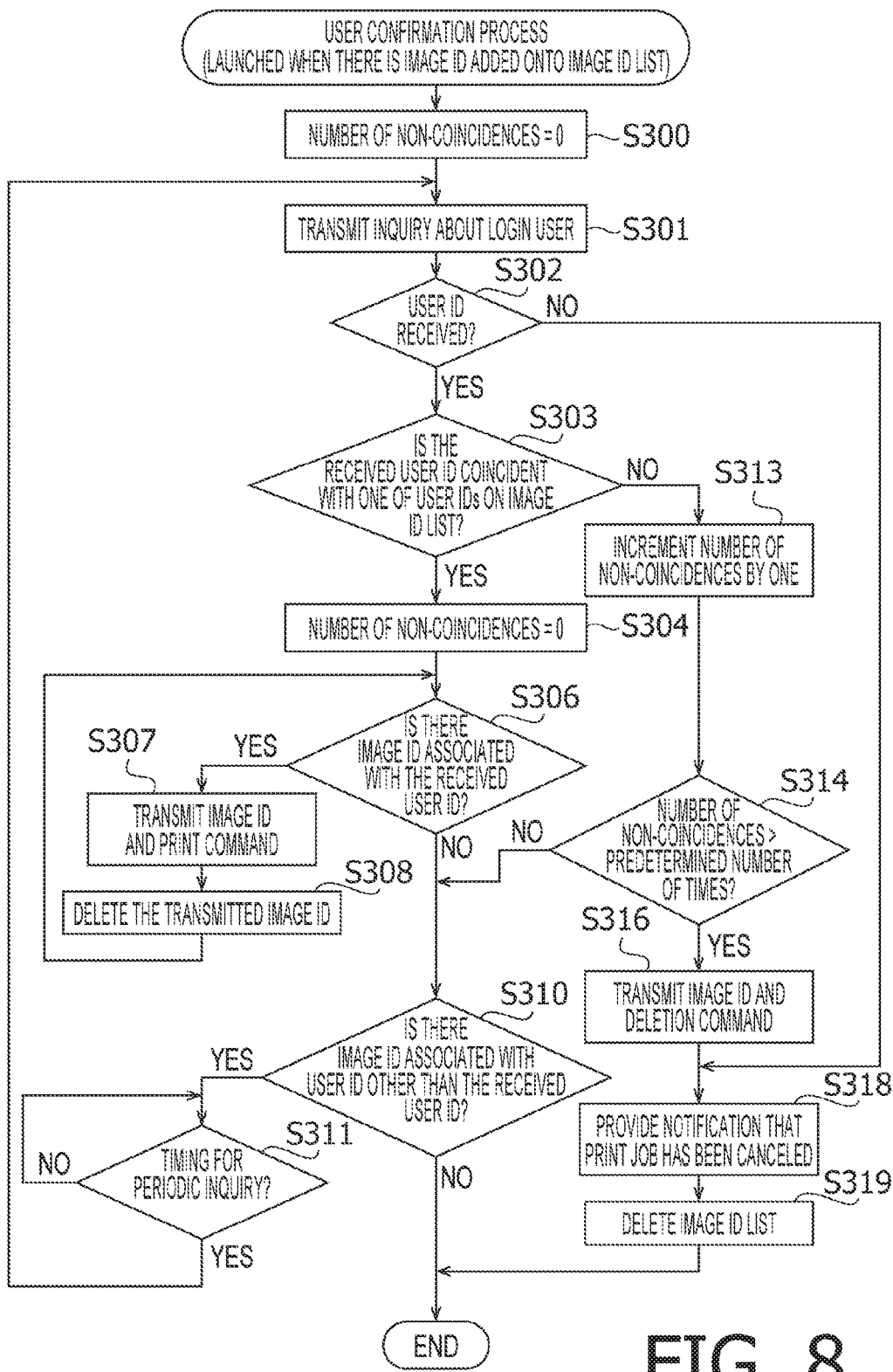

FIG. 8 is a flowchart showing a procedure of a user confirmation process to be executed by the CPU of the PC in the illustrative embodiment according to one or more aspects of the present disclosure.

Figure 9:
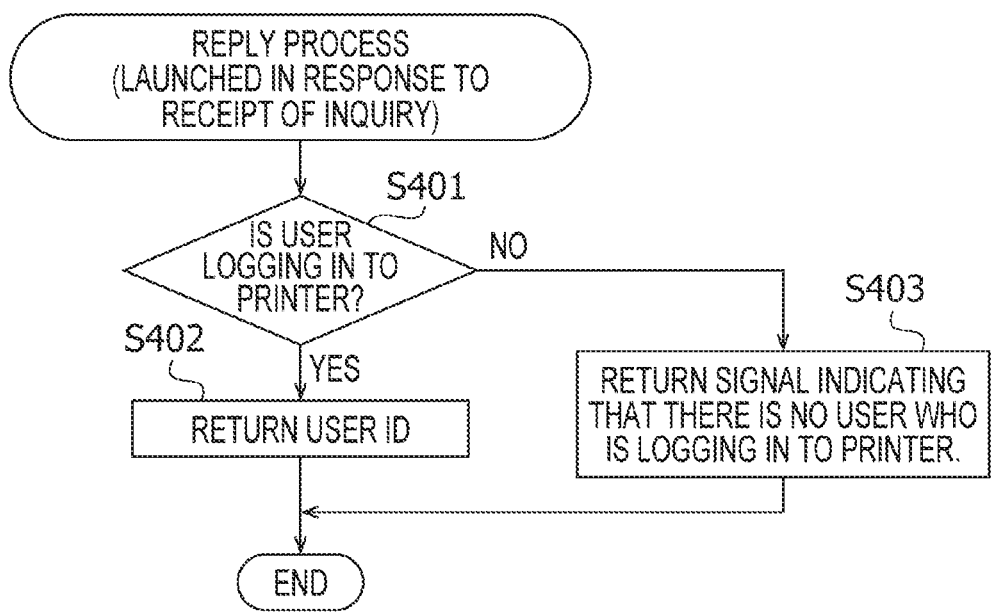

FIG. 9 is a flowchart showing a procedure of a reply process to be executed by the CPU (the controller) of the printer in the illustrative embodiment according to one or more aspects of the present disclosure.

Figure 10:
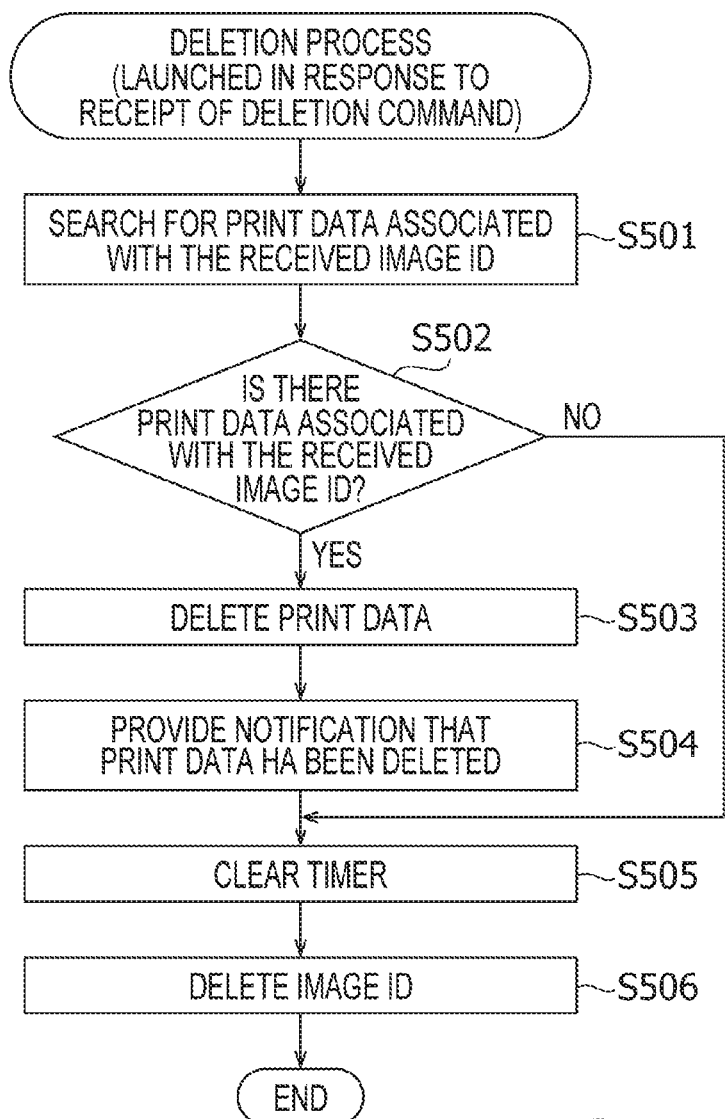

FIG. 10 is a flowchart showing a procedure of a deletion process to be executed by the CPU (the controller) of the printer in the illustrative embodiment according to one or more aspects of the present disclosure.

Figure 11:
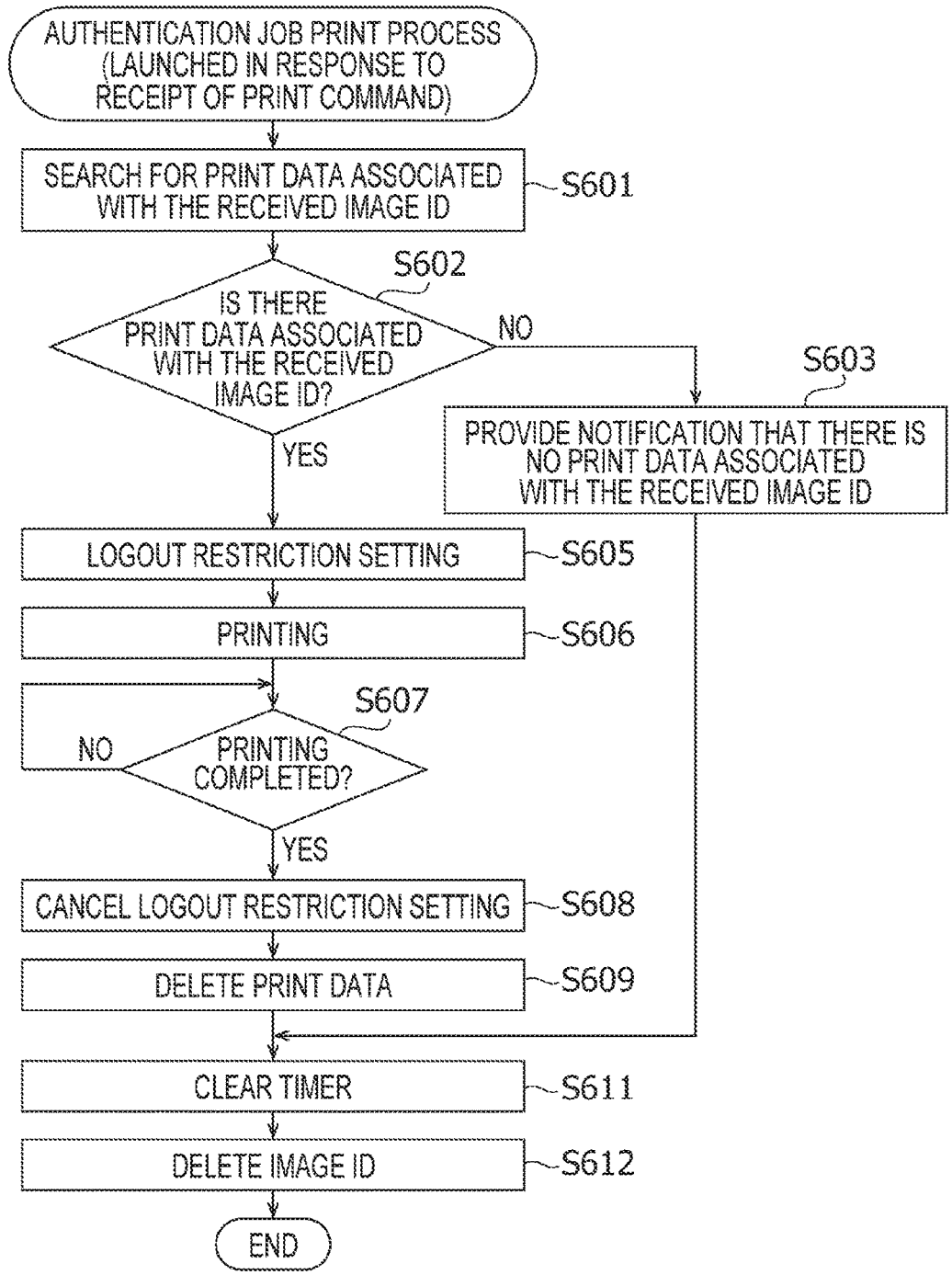

FIG. 11 is a flowchart showing a procedure of an authentication job print process to be executed by the CPU (the controller) of the printer in the illustrative embodiment according to one or more aspects of the present disclosure.

Figure 12:
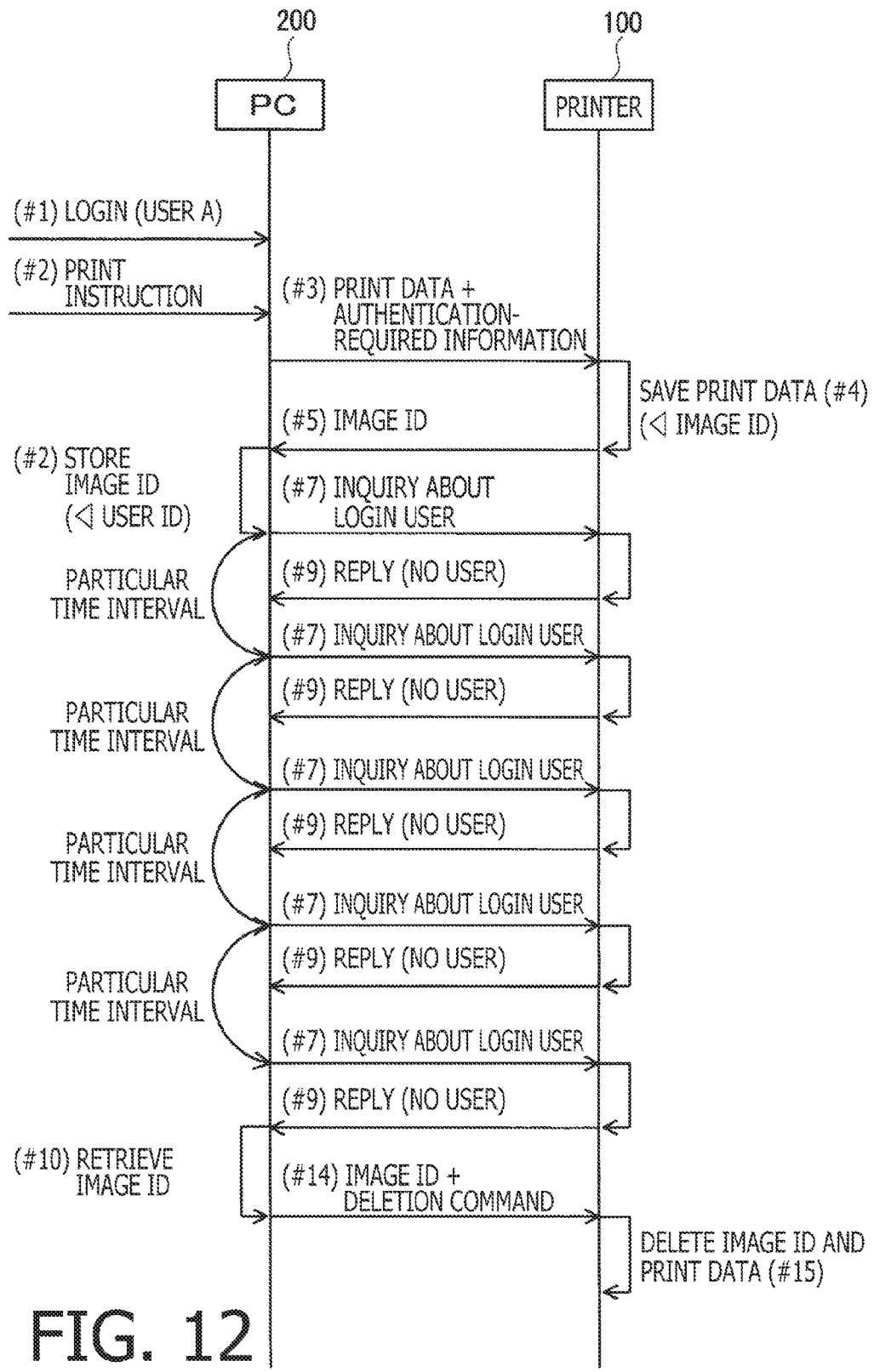

FIG. 12 shows a sequence of operations to be executed when an authentication job is deleted in the printing system in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. In the illustrative embodiment, aspects of the present disclosure are applied to a printing system including a printer having an image forming function and a personal computer (hereinafter referred to as a "PC") having a data transmission function.

Figure 1:
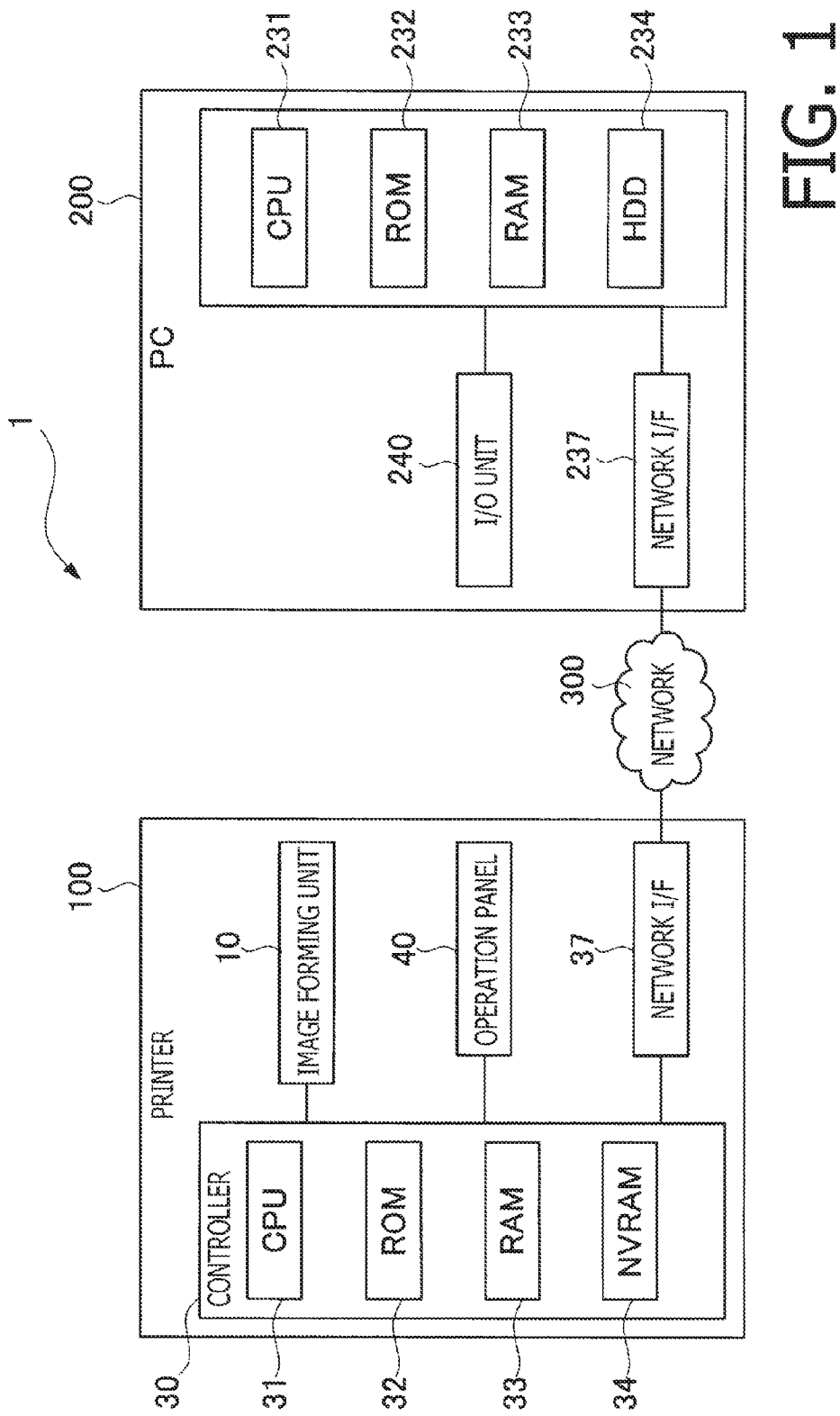
FIG. 1 is a block diagram showing an electrical configuration of a printing system in an illustrative embodiment according to one or more aspects of the present disclosure.

As shown in FIG. 1, a printing system 1 according to aspects of the present disclosure includes a printer 100 and a PC 200. The printer 100 and the PC 200 are communicably connected with each other via a network 300 such as the Internet. The printer 100 has a printing function and is configured to perform a printing operation based on print data received from the PC 200. The PC 200 transmits the print data to the printer 100, e.g., in accordance with a user instruction. The printer 100 is an example of a printer. The PC 200 is an example of an information processing apparatus. It is noted that although FIG. 1 only shows a single printer 100 and a single PC 200, two or more printers and two or more PCs may be connected with the network 300.

As shown in FIG. 1, the printer 100 includes a controller 30. The controller 30 includes a CPU 31, a ROM 32, a RAM 33, and a non-volatile RAM (hereinafter referred to as an "NVRAM") 34. Further, the printer 100 includes an image forming unit 10, an operation panel 40, and a network interface (hereinafter referred to as a "network I/F") 37. The image forming unit 10, the operation panel 40, and the network I/F 37 are electrically connected with the controller 30.

The image forming unit 10 is configured to form an image on a sheet in an image forming method such as an electrophotographic method or an inkjet method. The image forming unit 10 may be configured to form a color image, or may be configured specifically for monochrome image formation. The image forming unit 10 is an example of a printing unit.

The ROM 32 stores therein various control programs, various settings, and initial values for controlling the printer 100. The RAM 33 and the NVRAM 34 are used as work areas into which the various control programs are loaded or are used as storage areas for temporarily storing data. The RAM 33 and the NVRAM 34 are examples of a printer-side storage.

The CPU 31 is configured to control each element included in the printer 100 in accordance with the control programs read out of the ROM 32 while storing processing results into the RAM 33 or the NVRAM 34. The CPU 31 is an example of a printer-side controller. It is noted that the controller 30 shown in FIG. 1 may be a general term that represents integration of hardware elements (e.g., the CPU 31) used to control the printer 100, and may not necessarily represent a single hardware element that actually exists in the printer 100. The controller 30 may be an example of the printer-side controller.

The network I/F 37 is a hardware element configured to communicate with devices via the network 300. The network I/F 37 is an example of a printer-side communication unit. The operation panel 40 includes a liquid crystal display and operable members such as a start key, a stop key, and a numeric keypad. The operation panel 40 is configured to display messages to a user and accept user's input operations. The operation panel 40 is an example of a printer-side operation unit.

In the illustrative embodiment, the PC 200 of the printing system 1 is a processing apparatus configured to generate image data and perform image processing. As shown in FIG. 1, the PC 200 includes a CPU 231, a ROM 232, a RAM 233, and an HDD 234. The PC 200 further includes an input/output unit (hereinafter referred to as an "I/O unit") 240 and a network I/F 237.

The ROM 232 stores therein various programs and various settings. The RAM 233 and the HDD 234 are used as work areas into which the carious programs are loaded or are used as storage areas for temporarily storing data. The HDD 234 may be an internal HDD incorporated inside the PC 200 or an external HDD attached to the PC 200. The RAM 233 is an example of an information-processor-side storage. The CPU 231 is configured to execute the various programs, using the ROM 232 and the RAM 233. The CPU 231 is an example of an information-processor-side controller.

The network I/F 237 is a hardware element configured to communicate with devices via the network 300. The network I/F 237 is an example of an information-processor-side communication unit. The I/O unit 240 includes a display, a keyboard, and a mouse. The I/O unit 240 is configured to display various messages and accept user's input operations. The I/O unit 240 is an example of an information-processor-side operation unit. Further, the I/O unit 240 is an example of a notification unit.

Figure 2:
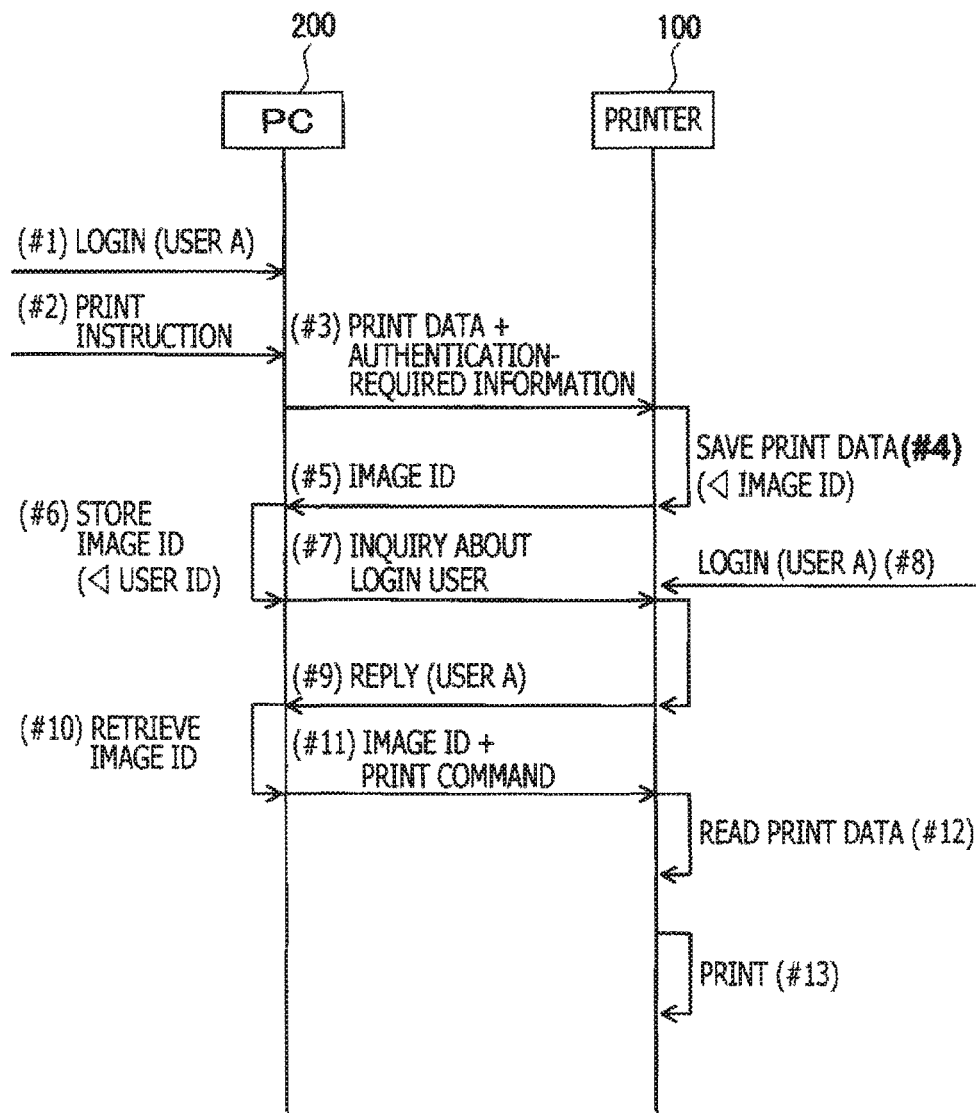
FIG. 2 shows a sequence of operations to be executed when a printing operation is performed based on an authentication job in the printing system in the illustrative embodiment according to one or more aspects of the present disclosure.

Subsequently, referring to FIG. 2, an explanation will be provided of a printing process to be executed in the printing system 1. FIG. 2 shows a time-series sequence of operations to be executed by the PC 200 and the printer 100 in the printing process, downward from the upper side of the figure. Arrows between a vertical line for the printer 100 and a vertical line for the PC 200 show flows of data communication between the PC 200 and the printer 100. Further, arrows from the left side of FIG. 2 to the vertical line for the PC 200 and arrows from the right side of FIG. 2 to the vertical line for the printer 100 indicate external inputs (e.g., user's inputs).

Print jobs to be used in the printing system 1 include authentication jobs and authentication-less jobs. The authentication jobs require user authentication on the printer 100. The authentication-less jobs do not require user authentication on the printer 100. FIG. 2 shows operations to be executed when the printer 100 performs a printing operation based on an authentication job in accordance with an instruction from the user of the PC 200.

The PC 200 accepts a login operation by the user in #1 shown in FIG. 2. The PC 200 determines whether to permit the user to log in to the PC 200 based on authentication information input via the login operation. When determining to permit the user to log in to the PC 200, the PC 200 stores into the RAM 233 a user ID contained in the authentication information as a user ID of the user who is logging in to the PC 200. Operations for login authentication on the PC 200 are executed by an operating system (hereinafter referred to as an "OS") installed in the PC 200. In #1 shown in FIG. 2, the PC 200 permits a user A to log in to the PC 200. In the following description, the user ID of the user who is logging in to the PC 200 will be referred to as a "PC user ID."

After acquiring the PC user ID, the PC 200 accepts a print instruction for the authentication job in #2 shown in FIG. 2. Hereinafter, an explanation will be provided of an example in which when the PC user ID identifies the "user A," the PC 200 accepts a print instruction to perform a printing operation based on print data "data A1" in the authentication job.

In #3 shown in FIG. 2, the PC 200 transmits the accepted print job to the printer 100. When accepting designation of the authentication job in the print instruction, the PC 200 adds authentication-required information to the print data, and transmits to the printer 100 the print data with the authentication-required information added thereto. Specifically, the PC 200 transmits to the printer 100 the print data "data A1" with the authentication-required information added thereto. It is noted that the authentication-required information indicates that the print data with the authentication-required information added thereto is print data of the authentication job.

Then, the printer 100 receives the print job form the PC 200 via the network 300. When the authentication-required information is added to the received print job, the printer 100 determines that the print job is an authentication job. Meanwhile, when the authentication-required information is not added to the received print job, the printer 100 determines that the print job is an authentication-less job. It is noted that the determination as to whether the received print job is an authentication job may not necessarily be made based on whether the authentication-required information is added to the print job. For instance, the determination may be made based on whether there is authentication-less information added to the print job, or may be made based on a value of authentication necessity information added to the print job.

When determining that the received print job is an authentication-less job, the printer 100 starts a printing operation at printable timing. For instance, when receiving the authentication-less job while awaiting printable timing, the printer 100 may immediately begin to perform a printing operation.

As a first step of a specific authentication procedure, in #4 shown in FIG. 2, the printer 200 generates an image ID to be associated with the print data of the received authentication job and stores the generated image ID into the RAM 33. For instance, the printer 100 has a print data list 63 (see FIG. 3) stored in the RAM 33, and registers the generated image ID and the print data in association with each other onto the print data list 63. FIG. 3 shows an example where the printer 100, which has already received and stored print data "data B1" and "data B2," newly receives the authentication job having the print data "data A1." The printer 100 generates an image ID "0003" for the newly-received authentication job, and stores the generated image ID "0003" in association with the print data "data A1" of the authentication job onto the print data list 63.

Further, in #5 shown in FIG. 2, the printer 100 transmits the generated image ID to the PC 200. The PC 200 receives the image ID from the printer 100. Then, in #6 shown in FIG. 2, the PC 200 stores the received image ID into the RAM 233. At this time, the PC 200 stores an image ID list 61 into the RAM 233. On the image ID list 61, for instance, as shown in FIG. 4, the received image ID is registered in association with the PC user ID of the user who has logged in to the PC 200 at a point of time when the print instruction has been issued. More specifically, in the illustrative embodiment, the PC 200 stores the received image ID "0003" in association with the PC user ID "user A" of the user who has transmitted the print data "A1." The PC 200 may store the image ID list 61 into the HDD 234.

Subsequently, in #7 shown in FIG. 2, the PC 200 transmits to the printer 100 an inquiry about a login user. Namely, the PC 200 transmits to the printer 100 a reply request that requests the printer 100 to return a user ID of a user who is logging in to the printer 100.

On the other hand, in #8 shown in FIG. 2, in a state where there is not a user who is logging in to the printer 100, the printer 100 accepts authentication information input via a login operation by the user, and performs user authentication. In response to successfully performing the user authentication, the printer 100 sets a user ID contained in the accepted authentication information as a user ID of a user who is logging in to the printer 100. More specifically, in the illustrative embodiment, in #8, the printer 100 succeeds in the user authentication for the user A, and sets the user ID of the user A as the user ID of the user who is logging in to the printer 100. Hereinafter, the user ID of the user who is logging in to the printer 100 will be referred to as a "printer user ID." A detailed explanation of a login process will be provided later. It is noted that a point of time at which the printer 100 accepts the authentication information may be earlier than #4.

When receiving the inquiry about the login user from the PC 200 in #7 while the user is logging in to the printer 100, the printer 100 returns the printer user ID to the PC 200 in #9 shown in FIG. 2. More specifically, in the illustrative embodiment, since the user A is logging in to the printer 100, the printer 100 returns the printer user ID "user A" to the PC 200. Meanwhile, when receiving the inquiry about the login user from the PC 200 in a state where there is not a user who is logging in to the printer 100, the printer 100 returns, to the PC 200, no-login-user information indicating that there is no user who is logging in to the printer 100. A process to be executed when there is no user who is logging in to the printer 100 will be described later.

When receiving the printer user ID returned in #9 by the printer 100 in response to the inquiry in #7, the PC 200 searches for a corresponding image ID in #10. Namely, the PC 200 retrieves, from the image ID list 61 shown in FIG. 4, an image ID associated with the PC user ID corresponding to the received printer user ID. Specifically, the PC 200 determines whether there is an image ID registered on the image ID list 61 in association with the printer user ID "user A" received from the printer 100.

Further, when determining that there is an image ID registered on the image ID list 61 in association with the printer user ID received from the printer 100, in #11 shown in FIG. 2, the PC 200 adds a print command to the image ID and transmits the image ID with the print command added thereto, to the printer 100. Specifically, the PC 200 adds the print command to the image ID "0003" associated with "user A" and transmits the image ID "0003" with the print command added thereto, to the printer 100.

When receiving the image ID and the print command, in #12, the printer 100 reads the print data corresponding to the received image ID, out of the print data list 63 shown in FIG. 3. Specifically, the printer 100 reads the print data "data A1" stored in association with the received image ID "0003." Further, in #13, the printer 100 performs a printing operation based on the read print data "data A1."

Namely, the user who is attempting to perform a printing operation based on the authentication print job is required to log in to the PC 200, input the print instruction, and further log in to the printer 100. In the printing system 1, the PC 200 determines whether the PC user ID associated with the image ID is coincident with the printer user ID returned by the printer 100. Further, when determining that the PC user ID is coincident with the printer user ID, the PC 200 transmits the print command to the printer 100. Namely, in the printing system 1, an authentication process is performed for each piece of print data without transmission of password information between the PC 200 and the printer 100.

Subsequently, referring to FIGS. 5 to 11, an explanation will be provided of processes to be executed by the printer 100 and the PC 200 to achieve the aforementioned printing process in the printing system 1. In order to achieve the printing process in the printing system 1, the printer 100 and the PC 200 perform the following processes in cooperation with each other. The CPU 31 (the controller 30) of the printer 100 performs a login process shown in FIG. 5, a print data receiving process shown in FIG. 7, a reply process shown in FIG. 9, a deletion process shown in FIG. 10, and an authentication job print process shown in FIG. 11. Further, the CPU 231 of the PC 200 performs an acceptance process shown in FIG. 6 and a user confirmation process shown in FIG. 8.

Firstly, the login process shown in FIG. 5 will be described. In response to acceptance of a login request, the CPU 31 (the controller 30) of the printer 100 launches the login process.

The CPU 31 of the printer 100 accepts an input of user information including a user ID via the operation panel 40. For instance, the user information may be a combination including the user ID and a password. The CPU 31 acquires the input user information (S11). The user information is an example of authentication information.

Then, the CPU 31 performs user authentication based on the input user information (S12). Specifically, for instance, the printer 100 may have an ID password association table stored in the NVRAM 34. On the ID password association table, one or more combinations may be registered each of which includes a user ID and a password of an authenticatable user. Then, in S12, the CPU 31 may determine whether the input user information is coincident with one of the combinations registered on the ID password association table stored in the NVRAM 34. It is noted that the printing system 1 may include an authentication server configured to perform user authentication. In this case, the CPU 31 may transmit the user information to the authentication server, cause the authentication server to perform user authentication, and receive a result of the user authentication from the authentication server.

The CPU 31 determines whether the user authentication has been successfully performed (S13). When the user information is coincident with one of the combinations registered on the ID password association table, the CPU 31 determines that the user authentication has been successfully performed (S13: Yes), and permits the user identified by the user information to log in to the printer 100 (S14). Then, the CPU 31 terminates the login process. The CPU 31 allows the user permitted to log in to the printer 100 to use the printer 100 within a permissible function range determined according to the user information.

Meanwhile, when the user information is not coincident with any combination registered on the ID password association table, the CPU 31 determines that the user authentication has not been successfully performed (S13: No), and does not permit the user identified by the user information to log in to the printer 100. In this case, for instance, the CPU 31 controls the operation panel 40 to display an error message (S15). Then, the CPU 31 terminates the login process. When not permitting the user identified by the user information to log in to the printer 100, the CPU 31 does not accept any operation but an input of user information or permit use of the printer 100.

A login process to be executed by the CPU 231 of the PC 200 is substantially the same as the login process shown in FIG. 5. For instance, in response to acceptance of a login request, the CPU 231 launches the same process as the login process shown in FIG. 5. After successful user authentication, the CPU 231 accepts subsequent operations.

Next, the acceptance process shown in FIG. 6 will be described. In response to acceptance of an input of a print instruction, the CPU 231 of the PC 200 launches the acceptance process. The CPU 231 accepts the print instruction after permitting a user identified by authenticated user information to log in to the PC 200.

Firstly, the CPU 231 determines whether an accepted print job is an authentication job (S101). For instance, when the authentication job is designated in the print instruction, the CPU 231 may determine that the accepted print job is an authentication job (S101: Yes). Alternatively, for instance, when the accepted job has information added thereto such as information requesting the printer 100 to return image identification information, information indicating a high priority or a high level of security, or information instructing the printer 100 to save image data, the CPU 231 may determine that the accepted print job is an authentication job (S101: Yes).

When determining that the accepted print job is not an authentication job (S101: No), the CPU 231 transmits print data and a print command to the printer 100 (S102). Namely, the CPU 231 transmits, to the printer 100, the print job to which authentication-required information is not added. Then, the CPU 231 terminates the acceptance process.

Meanwhile, when the authentication job is designated in the print instruction, and the CPU 231 determines that the accepted print job is an authentication job (S101: Yes), the CPU 231 acquires a user ID (i.e., a PC user ID) of the user permitted to log in to the PC 200 (S103). In S103, the CPU 231 acquires the PC user ID from a system OS. It is noted that the CPU 231 may acquire the PC user ID by inquiring the user about the PC user ID when the user inputs the print instruction.

Then, the CPU 231 adds authentication-required information to the print job, and transmits the print job including the authentication-required information and the print data to the printer 100 (S104).

When receiving the print job from the PC 200, the printer 100 (the CPU 31) performs the below-mentioned print data receiving process. Then, the printer 100 transmits an image ID corresponding to the received print data, to the PC 200 as a transmission source of the print job with the authentication-required information added thereto. After transmission of the print job in S104, the CPU 231 of the PC 200 determines whether the CPU 231 has received an image ID (S105). When determining that the CPU 231 has not received an image ID (S105: No), the CPU 231 waits until the CPU 231 receives an image ID.

When determining that the CPU 231 has received an image ID (S105: Yes), the CPU 231 additionally stores (registers) the received image ID in association with the PC user ID acquired in S103, onto the image ID list 61 shown in FIG. 4 (S106). Thereafter, the CPU 231 terminates the acceptance process.

The CPU 231 is allowed to accept a print instruction of another authentication job before completion of the previously-accepted authentication job. Namely, as shown in FIG. 4, the CPU 231 may store a plurality of PC user IDs and a plurality of image IDs in association with each other on the image ID list 61. Specifically, in S106, when there is already a field for the PC user ID on the image ID list 61, the CPU 231 adds the image ID received in S105 into the field on the image ID list 61. When there is not a field corresponding to the PC user ID in the image ID list 61, the CPU 231 prepares a field for the PC user ID on the image ID list 61, and adds the image ID received in S105 into the field on the image ID list 61. It is noted that when the PC 200 is connected with a plurality of printers, an image ID list may be created for each individual printer.

Subsequently, the print data receiving process shown in FIG. 7 will be described. In response to acceptance of the print job transmitted from the PC 200 to the printer 100 in S102 or S104 of the acceptance process shown in FIG. 6, the CPU 31 (the controller 30) of the printer 100 launches the print data receiving process.

After launching the print data receiving process, the CPU 31 first receives print data of the print job (S201). Then, the CPU 31 determines whether the received print job is an authentication job (S202). When the received job does not have the authentication-required information added thereto, the CPU 31 determines that the received print job is not an authentication job (S202: No). Or, when the received job has a print command added thereto, the CPU 31 determines that the received print job is not an authentication job (S202: No). For instance, in S102 of the acceptance process shown in FIG. 6, the print data transmitted by the PC 200 does not have the authentication-required information but has the print command added thereto.

When determining that the received print job is not an authentication job (S202: No), the CPU 31 controls the image forming unit 10 to perform a printing operation based on the print data of the received print job (S203). Thereafter, the CPU 31 terminates the print data receiving process.

Meanwhile, when determining that the received print job is an authentication job (S202: Yes), the CPU 31 generates an image ID to be stored in association with the print data received in S201 (S204). A single image ID is information for identifying an individual piece of print data, and is not redundantly associated with two or more pieces of print data. The image ID is an example of image identification information.

The CPU 31 stores the generated image ID and the received print data in association with each other on the print data list 63 shown in FIG. 3 (S206). Further, the CPU 31 transmits the generated image ID to the PC 200 (S207).

The CPU 31 sets and starts a timer for the stored print job (S210). On the basis of the timer, the CPU 31 deletes the print job when a printing operation based on the print job has not been performed even after a lapse of a predetermined period of time since receipt of the print job. The CPU 31 determines whether a time-out has occurred, by determining whether a period of time measured by the timer exceeds the predetermined period of time (S211).

When determining that a time-out has occurred (S211: Yes), the CPU 31 deletes the print data and the image ID from the print data list 63 (S212). Further, the CPU 21 provides a notification that the print data has been deleted (S213). Thereafter, the CPU 21 terminates the print data receiving process. In S213, the CPU 31 displays the notification on the operation panel 40, and transmits to the PC 200 a notification signal for informing that the print data has been deleted. In response to receipt of the notification signal from the printer 100, the CPU 231 of the PC 200 deletes the corresponding image ID from the image ID list 61 and controls the I/O unit 240 to display information that the corresponding image ID has been deleted. Further, instead of displaying the notification on the operation panel 40, the CPU 31 of the printer 100 may provide the notification by a warning lamp or a buzzer sounding a warning tone.

Meanwhile, when determining that a time-out has not occurred (S211: No), the CPU 31 determines whether the timer has been cleared (S215). When completely performing the below-mentioned authentication job print process for a print job, the CPU 31 clears a timer set for the print job. Further, when a print job has been deleted in the below-mentioned deletion process, the CPU 31 clears a timer set for the print job. Namely, when a timer has been cleared, it denotes that a print job corresponding to the timer has been deleted in a process different from the print data receiving process.

When determining that the timer has been cleared (S215: Yes), the CPU 31 terminates the print data receiving process. Meanwhile, when determining that the timer has not been cleared (S215: No), the CPU 31 goes back to S211 and waits until a time-out occurs or until the timer is cleared.

Next, the user confirmation process shown in FIG. 8 will be described. The user confirmation process is performed by the CPU 231 of the PC 200 on condition that an image ID is registered on the image ID list 61 and that the user confirmation process is not in execution. Specifically, after the CPU 231 accepts a print instruction of an authentication job in a state where there is no image ID registered on the image ID list 61, in response to an image ID being added onto the image ID list 61 in S106 shown in FIG. 6, the CPU 231 of the PC 200 launches the user confirmation process.

In the user confirmation process, the CPU 231 first sets the number of non-coincidences to zero (S300). The number of non-coincidences is the number of consecutive cases where the user ID received from the printer 100 as a reply to each periodically-transmitted reply request is not coincident with any user ID stored on the image ID list 61. As will be described later, when the number of non-coincidences exceeds a predetermined number of times, the CPU 231 cancels the print job.

The CPU 231 transmits an inquiry about a login user to the printer 100 (S301). Namely, the CPU 231 transmits a reply request to the printer 100. The reply request requests the printer 200 to return a printer user ID of a user who is logging in to the printer 100.

In response to receipt of the inquiry transmitted in S301, the CPU 31 (the controller 30) of the printer 100 launches the reply process shown in FIG. 9.

In the reply process, the CPU 31 of the printer 100 determines whether a user is logging in to the printer 100 (S401). As described above, the situation where a user is logging in to the printer 100 represents a state where the CPU 31 has succeeded in user authentication after acceptance of authentication information through a login operation by the user. When determining that a user is logging in to the printer 100 (S401: Yes), the CPU 31 returns a printer user ID to the PC 200 (S402). Thereafter, the CPU 31 terminates the reply process. Meanwhile, when determining that there is not a user who is logging in to the printer 100 (S401: No), the CPU 31 returns to the PC 200 a signal indicating that there is no user who is logging in to the printer 100 (S403). Thereafter, the CPU 31 terminates the reply process.

Referring back to the user confirmation process shown in FIG. 8, the CPU 231 of the PC 200 determines whether the CPU 231 has received from the printer 100 a reply to the inquiry transmitted in S301 (S302). When determining that the CPU 231 has received a user ID from the printer 100 (S302: Yes), the CPU 231 determines whether the received user ID is coincident with one of the user IDs registered on the image ID list 61 (S303). When determining that the received user ID is coincident with one of the user IDs registered on the image ID list 61 (S303: Yes), the CPU 231 clears the number of non-coincidences, i.e., sets the number of non-coincidences to zero (S304).

After clearing the number of non-coincidences, the CPU 231 searches the image ID list 61 shown in FIG. 4, and determines whether there is an image ID associated with the user ID that is determined to be coincident with one of the user IDs registered on the image ID list 61 (S306).

When determining that there is an image ID associated with the user ID (S306: Yes), the CPU 231 adds the image ID to a print command and transmits the print command to the printer 100 (S307). Further, after transmitting the print command, the CPU 231 deletes the image ID transmitted to the printer 100, from the image ID list 61 (S308).

Then, the CPU 231 goes back to S306, and determines whether there is an image ID associated with the printer user ID received from the printer 100. When determining that there is an image ID associated with the printer user ID received from the printer 100 (S306: Yes), the CPU 231 transmits to the printer 100 a print command with the image ID added thereto (S307), and deletes the image ID from the image ID list 61 (S308). Then, the CPU 231 repeatedly performs the steps S306 to S308 until there becomes no image ID associated with the printer user ID. When there becomes no image ID associated with the printer user ID, the CPU 231 may delete the field for the user ID from the image ID list 61.

When determining that there is not an image ID associated with the printer user ID that is determined to be coincident with one of the user IDs registered on the image ID list 61 (S306: No), the CPU 231 determines whether there is stored on the image ID list 61, an image ID associated with a user ID other than the printer user ID received from the printer 100 (S310). When determining that there is not stored on the image ID list 61, an image ID associated with a user ID other than the printer user ID received from the printer 100 (S310: No), the CPU 231 terminates the user confirmation process.

Meanwhile, when determining that there is stored on the image ID list 61, an image ID associated with a user ID other than the printer user ID received from the printer 100 (S310: Yes), the CPU 231 periodically and repeatedly transmits an inquiry about a login user to the printer 100 (S301). In order to periodically and repeatedly perform the step S301, the CPU 231 determines whether it is timing for the periodic inquiry (S311). For instance, when launching the user confirmation process, the CPU 231 may start a timer to measure a particular period of time. In S311, when determining that a time-out has not occurred based on the timer, the CPU 231 determines that it is not timing for the periodic inquiry (S311: No), and waits until it becomes timing for the periodic inquiry. When determining that a time-out has occurred based on the timer, the CPU 231 determines that it is timing for the periodic inquiry (S311: Yes), resets the timer, and goes back to S301. In S301, the CPU 231 transmits an inquiry about a login user to the printer 100.

Although the CPU 231 receives a user ID from the printer 100 as a result of transmission of the inquiry to the printer 100, when the received user ID is not coincident with any user ID registered on the image ID list 61 (S303: No), the CPU 231 increments the number of non-coincidences by one (S313). It is noted that when receiving from the printer 100 a signal indicating that there is no user ID coincident with the received printer user ID on the image ID list 61, the CPU 231 may make a negative determination in S303 (S303: No). Further, when adding a new image ID onto the image ID list 61 in the aforementioned acceptance process, the CPU 231 may set the number of non-coincidences to zero.

The CPU 231 determines whether the number of non-coincidences is larger than a predetermined number of times (S314). When determining that the number of non-coincidences is not larger than the predetermined number of times (S314: No), the CPU 231 goes to S310. In S310, the CPU 231 determines whether there is stored on the image ID list 61, an image ID associated with a user ID other than the printer user ID received from the printer 100. Further, as described above, when determining that there is stored on the image ID list 61, an image ID associated with a user ID other than the printer user ID received from the printer 100 (S310: Yes), the CPU 231 periodically and repeatedly transmits an inquiry about a login user to the printer 100 (S301). Meanwhile, when determining that there is not stored on the image ID list 61, an image ID associated with a user ID other than the printer user ID received from the printer 100 (S310: No), the CPU 231 terminates the user confirmation process. It is noted that an image ID on the image ID list 61 may be deleted, e.g., by a deletion instruction from the printer 100 as well as the operation in S308 of the user confirmation process.

Namely, while there is an image ID remaining on the image ID list 61, and the number of non-coincidences is not larger than the predetermined number of times, for instance, as shown in FIG. 12, the PC 200 (the CPU 231) periodically transmits the inquiry to the printer 100 in #7. FIG. 12 exemplifies a case where the printer 100 repeatedly transmits to the PC 200 a reply signal indicating that there is no login user in response to the inquiry from the PC 200. For instance, when receiving the reply signal indicating that there is no login user in #9, as shown in S311 of FIG. 8, the PC 200 periodically transmits an inquiry about a login user to the printer 100.

Meanwhile, in S314 shown in FIG. 8, when determining that the number of non-coincidences is larger than the predetermined number of times (S314: Yes), the CPU 231 transmits the image ID remaining on the image ID list 61 and a deletion command, to the printer 100 (S316). Namely, when a situation continues where a user ID registered on the image ID list 61 has not been returned though the inquiry has repeatedly been transmitted to the printer 100, the CPU 231 cancels the print job. Before transmitting the deletion command to the printer 100 in S316, the CPU 231 may ask the user whether to delete the print data.

For instance, as shown in FIG. 12, when a situation continues where there is no login user who is logging in to the printer 100, and the PC 200 (the CPU 231) has received the reply signal indicating that there is no login user more than a predetermined number of times, the PC 200 retrieves the image ID stored on the image ID list 61 in #10. Then, the PC 200 transmits to the printer 100 a deletion command with the image ID added thereto. The printer 100, which has received the deletion command, performs the below-mentioned deletion process to delete the image ID and the print data in #15.

After transmission of the deletion command in S316 shown in FIG. 8, the CPU 231 controls the I/O unit 240 to provide a notification that the print job has been canceled (S318). Further, the CPU 231 deletes the image ID list 61 (S319). Thereafter, the CPU 231 terminates the user confirmation process. In S319, instead of deleting the image ID list 61, the CPU 231 may delete all the image IDs from the image ID list 61.

Further, when the CPU 231 has not received a user ID from the printer 100 in response to transmission of the inquiry for a login user to the printer 100 (S302: No), the CPU 231 deletes the print job. When the CPU 231 has not received a user ID from the printer 100, the printer 100 is likely to be in an uncommunicable state, e.g., due to power-off or communication failure of the printer 100. In this case, the printer 100 is less likely to save the print data therein. Even if the printer 100 saves the print data therein, the printer 100 is less likely to be able to immediately perform a printing operation. Therefore, the CPU 231 cancels the print job. Then, the CPU 231 controls the I/O unit 240 to provide a notification that the print job has been deleted (S318). Further, the CPU 231 deletes the image ID list 61 (S319). Thereafter, the CPU 231 terminates the user confirmation process.

As described above, when receiving a user ID coincident with one of the user IDs registered on the image ID list 61 (S302: Yes, and S303: Yes), the PC 200 (the CPU 231) stops periodic transmission of the inquiry. Further, when there becomes no image ID stored on the image ID list 61, and the CPU 231 determines in S310 that there is not stored on the image ID list 61, an image ID associated with a user ID other than the printer user ID received from the printer 100 (S310: No), or when the CPU 231 deletes the image ID list 61 in S319, the CPU 231 terminates the user confirmation process shown in FIG. 8, and ends periodic transmission of the inquiry to the printer 100.

Subsequently, the deletion process shown in FIG. 10 will be described. In response to receipt of the deletion command transmitted by the PC 200 (the CPU 231) in S316 of the user confirmation process shown in FIG. 8, the CPU 31 (the controller 30) of the printer 100 launches the deletion process.

When receiving the deletion command along with the image ID from the PC 200, the CPU 31 first searches for print data associated with the received image ID, from the print data list 63 shown in FIG. 3 (S501). Thereby, the CPU 31 determines whether there is stored on the print data list 63, print data associated with the received image ID (S502). When determining that there is print data associated with the received image ID (S502: Yes), the CPU 31 deletes the print data (S503). Further, the CPU 31 controls the operation panel 40 to provide a notification that the print data has been deleted (S504). In addition, the CPU 31 clears the timer that has been started in S210 of the print data receiving process shown in FIG. 7 (S505). Furthermore, the CPU 31 deletes the image ID from the print data list 63 (S506). Thereafter, the CPU 31 terminates the deletion process.

When determining that there is not print data associated with the received image ID (S502: No), the CPU 31 clears the aforementioned timer (S505). Then, the CPU 31 deletes the image ID from the print data list 63 (S506). Thereafter, the CPU 31 terminates the deletion process. By clearing the timer in S505, the CPU 31 terminates the print data receiving process (see FIG. 7) for the print data corresponding to the image ID.

Next, the authentication job print process shown in FIG. 11 will be described. In response to receipt of the image ID and the print command transmitted by the PC 200 in S307 of the user confirmation process shown in FIG. 8, the CPU 31 (the controller 30) of the printer 100 launches the authentication job print process.

When receiving the print command, the CPU 31 of the printer 100 first searches for print data associated with the received image ID, from the print data list 63 shown in FIG. 3 (S601). Thereby, the CPU 31 determines whether there is stored on the print data list 63, print data associated with the received image ID (S602). When determining that there is not print data associated with the received image ID (S602: No), the CPU 31 controls the operation panel 40 to provide a notification that there is no print data (S603).

Meanwhile, when determining that there is print data associated with the received image ID (S602: Yes), the CPU 31 configures a logout restriction setting (S605). The logout restriction setting is a setting to restrict the user from logging out from the printer 100. Under the logout restriction setting, for instance, the printer 100 may not be allowed to accept an input of a logout instruction via the operation panel 40. Alternatively, under the logout restriction setting, the printer 100 may be allowed to accept an input of a logout instruction, but may be restricted from successfully performing a logout operation.

It is not desirable that a user of an authentication job logs out from the printer 100 and leaves the printer 100 during a printing operation based on the authentication job. Thus, the printer 100 prohibits the user from logging out from the printer 100 until the printing operation based on the authentication job is completely performed. Since the user is restricted from logging out from the printer 100, the user is expected to continue to be beside the printer 100. It is noted that preferably, in S605, the printer 100 may control the operation panel 40 to provide a notification that the user is prohibited from logging out from the printer 100 during the printing operation based on the authentication job.

The CPU 31 of the printer 100 performs a printing operation based on the retrieved print data (S606). Then, the CPU 31 determines whether the printing operation has been completed (S607). When determining that the printing operation has not been completed (S607: No), the CPU 31 continues to perform the printing operation until the printing operation is completed. When determining that the printing operation has been completed (S607: Yes), the CPU 31 cancels the logout restriction setting (S608).

Further, the CPU 31 deletes the print data for which the printing operation has been completed (S609). After S609 or after controlling the operation panel 40 to provide the notification that there is no print data in S603, the CPU 31 clears the timer that has been started in S210 of the print data receiving process shown in FIG. 7 (S611). Further, the CPU 31 deletes the image ID associated with the printed print data (S612). Thereafter, the CPU 31 terminates the authentication job print process. It is noted that the image ID may be deleted at any time after completion of the printing operation (S607: Yes).

As described above, according to the printing system 1 of the illustrative embodiment, print data is transmitted from the PC 200 to the printer 100, and an image ID for identifying the print data is transmitted from the printer 100 to the PC 200. Then, the PC 200 stores the received image ID and a PC user ID in association with each other. Further, the PC 200 transmits an inquiry about a login user to the printer 100. Then, when a user ID returned by the printer 100 in response to the inquiry is coincident with the PC user ID stored in the PC 200, the PC 200 transmits the image ID associated with the user ID and a print command to the printer 100. The printer 100 begins to perform a printing operation based on the print data associated with the received image ID. Namely, when the authentication job is executed, a password is not transmitted between the PC 100 and the printer 100. Therefore, it is possible to achieve the printing system 1 with a low risk of password leakage and a high level of security. Further, the print command for the image data is transmitted in a state where the image data has begun to be transmitted. Thus, it is possible to achieve the printing system 1 configured such that the printer 100 begins to perform the printing operation immediately in response to receipt of the print command and completes the printing operation early.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Aspects of the present disclosure may be applied to devices or apparatuses having a login function, a data communication function, and an image forming function, such as copy machines, multi-function peripherals, and facsimile machines, as well as printers. Further, aspects of the present disclosure may be applied to devices or apparatuses having a login function and a data communication function, such as tablet computers and smartphones, as well as PCs.

The information-processor-side operation unit may be a keyboard, a mouse, or a touch panel. An input operation for logging in to the printer 100 or the PC 200 may be a manual input operation through a touch panel or buttons, or may be an input operation via wireless communication using an IC tag. User information may be any kind of information as far as the information includes at least a user ID. The printer 100 may be configured to, when not successfully performing user authentication, restrict the user from using all or a part of the functions of the printer 100. In addition, the PC 200 may be configured to, when not successfully performing user authentication, restrict the user from using all or a part of the functions of the PC 200.

In the aforementioned illustrative embodiment, the PC 200 periodically transmits an inquiry about a login user to the printer 100. Nonetheless, for instance, the PC 200 may transmit a reply request to the printer 100 at one or more predetermined clock times. Instead, the PC 200 may transmit a reply request to the printer 100 after a lapse of a predetermined period of time since receipt of an image ID. Alternatively, the PC 200 may periodically transmit a reply request to the printer 100 during a period of time between when the PC 200 is powered on and when the PC 200 is powered off.

The step S319 may be omitted in the user confirmation process. For instance, the PC 200 may be configured to, when the number of non-coincidences is larger than the predetermined number of times (S314: Yes) or when there is no reply received from the printer 100 (S302: No), provide only a warning without transmitting the deletion command to the printer 100. A determination criterion for determining whether to perform the operation in S319 may be duration of non-coincidence between the PC user ID and the user ID received from the printer 100, instead of the number of non-coincidences.

The printer 100 may not configure the logout restriction setting to restrict the user from logging out from the printer 100 during execution of a printing operation. For instance, the printer 100 may control the operation panel 40 to only provide a notification that the printer 100 is performing a printing operation based on the authentication job or a warning for preventing the user from leaving printed sheets behind.

Further, the PC 200 may be configured to accept an instruction to display on the I/O unit 240 a list of one or more print jobs registered on the image ID list 61. For instance, in response to receipt of a request from the user, the PC 200 may display a list of one or more print jobs that have already been transmitted to the printer 100 with the corresponding user ID. Further, the PC 200 may be configured to accept an instruction to designate an individual print job on the image ID list 61 and delete the designated print job. Moreover, in this case, the PC 200 may be configured to, in response to acceptance of the instruction to delete the print job designated from the image ID list 61, transmit an image ID of the designated print job and a deletion command to the printer 100.

Further, for instance, the printer 100 may be configured to, when performing the deletion process, store into the RAM 33 a record indicating image data deleted in the deletion process. The record may be read out from the RAM 33 when the user operates the printer 100.

In the printing system 1 of the aforementioned illustrative embodiment, the accepted authentication job is printed after the authenticated user logs in to the printer 100. In this case, for instance, the PC may be configured to control the I/O unit 240 to provide a notification for prompting the user, who has input a print instruction, to log in to the printer 100.

The processes exemplified in the aforementioned illustrative embodiment may be executed by one or more hardware elements such as one or more CPUs, one or more ASICs, or a combination of one or more CPUs and one or more ASICs. The processes exemplified in the aforementioned illustrative embodiment may be executed in accordance with computer software stored on a non-transitory computer-readable medium or a method adapted to be implemented on one or more hardware elements.

What is claimed is:

1. A printing system comprising:
a printer; and
an information processing apparatus comprising:
an information-processor-side operation unit;
an information-processor-side communication unit;
an information-processor-side storage;
an information-processor-side controller configured to:
perform an acceptance process comprising:
acquiring an information-processor user ID;
accepting a print instruction via the information-processor-side operation unit, the print instruction including image data, the print instruction instructing the information processing apparatus to cause the printer to perform a printing operation based on the image data included in the print instruction;
transmitting the image data included in the print instruction to the printer via the information-processor-side communication unit;
receiving image identification information from the printer via the information-processor-side communication unit, the image identification information being returned by the printer in response to the printer receiving the image data from the information processing apparatus, the image identification information identifying the image data; and
in response to receipt of the image identification information, storing, into the information-processor-side storage, the received image identification information in association with the acquired information-processor user ID; and
after transmitting the image data and receiving the image identification data, perform a user confirmation process comprising:
transmitting a reply request to the printer via the information-processor-side communication unit, the reply request requesting the printer to return to the information processing apparatus a printer user ID of a user who is logging in to the printer;
in response to receipt of the printer user ID from the printer, determining whether the received printer user ID is coincident with the information-processor user ID stored in the information-processor-side storage; and
when determining that the received printer user ID is coincident with the information-processor user ID stored in the information-processor-side storage, transmitting a print command and the image identification information that is stored in the information-processor-side storage in association with the information-processor user ID coincident with the printer user ID, to the printer via the information-processor-side communication unit, the print command instructing the printer to perform the printing operation based on the image data identified by the image identification information associated with the information-processor user ID coincident with the printer user ID,
wherein the printer comprises:
a printing unit;
a printer-side operation unit;
a printer-side communication unit;
a printer-side storage; and
a printer-side controller configured to:
perform a print data receiving process comprising:
receiving the image data from the information processing apparatus via the printer-side communication unit;
generating the image identification information identifying the received image data;
storing, into the printer-side storage, the received image data in association with the generated image identification information; and
transmitting the generated image identification information to the information processing apparatus via the printer-side communication unit;
after receiving the image data and transmitting the image identification information, perform a printer-side login process comprising:
accepting authentication information via the printer-side operation unit, the authentication information including the printer user ID;
performing user authentication based on the accepted authentication information; and
permitting the user identified by the printer user ID to log in to the printer when successfully performing the user authentication, and not permitting the user identified by the printer user ID to log in to the printer when not successfully performing the user authentication;
perform a reply process comprising:
receiving the reply request from the information processing apparatus via the printer-side communication unit, the reply request requesting the printer to return to the information processing apparatus the printer user ID of the user who is logging in to the printer; and
in response to receipt of the reply request, returning the printer user ID included in the authentication information used for the successful user authentication, to the information processing apparatus via the printer-side communication unit; and
after returning the print user ID used for the successful user authentication, perform a print process comprising:
receiving the print command and the image identification information from the information processing apparatus via the printer-side communication unit, the print command instructing the printer to perform the printing operation based on the image data associated with the image identification information;
in response to receipt of the print command and the image identification information, determining whether the image data associated with the received image identification information is stored in the printer-side storage; and
when determining that the image data associated with the received image identification information is stored in the printer-side storage, controlling the printing unit to perform the printing operation based on the image data associated with the received image identification information,
wherein the information-processor-side controller is configured to:
  determine whether to add particular information;
  when determining to add the particular information, add the particular information to the image data and transmit the image data with the added particular information to the printer via the information-processor-side communication unit; and
  when determining not to add the particular information, transmit the image data, without adding the particular information, to the printer via the information-processor-side communication unit, and
wherein the printer-side controller is configured to:
  when the image data received from the information processing apparatus via the printer-side communication unit has the particular information added to the image data, store the image data into the printer-side storage; and
  when the received image data does not have the particular information added to the image data, control the printing unit to perform the printing operation based on the image data, without storing the image data into the printer-side storage.

2. The printing system according to claim 1,
wherein the information-processor-side controller is configured to:
  when determining not to add the particular information, add a print command to the image data and transmit the image data with the print command to the printer via the information-processor-side communication unit, and
wherein the printer-side controller is configured to:
  when the received image data does not have the print command added thereto, store the image data into the printer-side storage; and
  when the received image data has the print command added thereto, control the printing unit to perform the printing operation based on the image data, without storing the image data into the printer-side storage.

3. A printer comprising:
a printing unit;
an operation unit;
a communication unit configured to communicate with an information processing apparatus;
a storage; and
a controller configured to:
  perform a print data receiving process comprising:
    receiving image data from the information processing apparatus via the communication unit;
    generating image identification information identifying the received image data;
    storing, into the storage, the received image data in association with the generated image identification information; and
    transmitting the generated image identification information to the information processing apparatus via the communication unit;
  after receiving the image data and transmitting the image identification information, perform a login process comprising:
    accepting authentication information via the operation unit, the authentication information including printer user ID;
    performing user authentication based on the accepted authentication information; and
    permitting a user identified by the printer user ID to log in to the printer when successfully performing the user authentication, and not permitting the user identified by the printer user ID to log in to the printer when not successfully performing the user authentication;
  perform a reply process comprising:
    receiving a reply request from the information processing apparatus via the communication unit, the reply request requesting the printer to return to the information processing apparatus the printer user ID of the user who is logging in to the printer; and
    in response to receipt of the reply request, returning the printer user ID included in the authentication information used for the successful user authentication, to the information processing apparatus via the communication unit; and
  after returning the print user ID used for the successful user authentication, perform a print process comprising:
    receiving a print command and the image identification information from the information processing apparatus via the communication unit, the print command instructing the printer to perform the printing operation based on the image data associated with the image identification information;
    in response to receipt of the print command and the image identification information, determining whether the image data associated with the received image identification information is stored in the storage; and
    when determining that the image data associated with the received image identification information is stored in the storage, controlling the printing unit to perform the printing operation based on the image data associated with the received image identification information,
wherein the controller is configured to:
  when the image data received from the information processing apparatus via the communication unit has particular information added to the image data, store the image data into the storage; and
  when the received image data does not have the particular information added to the image data, control the printing unit to perform the printing operation based on the image data, without storing the image data into the storage.

4. The printer according to claim 3,
wherein the controller is configured to, when the printing unit does not begin the printing operation based on the image data even after a lapse of a predetermined period of time since the image data is stored into the storage, delete the image data from the storage.

5. The printer according to claim 4,
wherein the controller is configured to, after deleting the image data from the storage, transmit to the information processing apparatus a notification signal indicating that the image data has been deleted.

6. The printer according to claim 3,
wherein the controller is configured to, after controlling the printing unit to begin the printing operation based on the image data, configure a logout restriction setting until the printing operation is completed, the logout restriction setting restricting the printer from accepting a logout instruction.

7. The printer according to claim 3, wherein the controller is configured to:
when the received image data does not have a print command added thereto, store the image data into the storage; and
when the received image data has a print command added thereto, control the printing unit to perform the printing operation based on the image data, without storing the image data into the storage.

8. An information processing apparatus comprising:
an operation unit;
a communication unit configured to communicate with a printer;
a storage;
a controller configured to:
perform an acceptance process comprising:
acquiring an information-processor user ID;
accepting a print instruction via the operation unit, the print instruction including image data, the print instruction instructing the information processing apparatus to cause the printer to perform a printing operation based on the image data included in the print instruction;
transmitting the image data included in the print instruction to the printer via the communication unit;
receiving image identification information from the printer via the communication unit, the image identification information being returned by the printer in response to the printer receiving the image data from the information processing apparatus, the image identification information identifying the image data; and
in response to receipt of the image identification information, storing, into the storage, the received image identification information in association with the acquired information-processor user ID; and
after transmitting the image data and receiving the image identification data, perform a user confirmation process comprising:
transmitting a reply request to the printer via the communication unit, the reply request requesting the printer to return to the information processing apparatus a printer user ID of a user who is logging in to the printer;
in response to receipt of the printer user ID from the printer, determining whether the received printer user ID is coincident with the information-processor user ID stored in the storage; and
when determining that the received printer user ID is coincident with the information-processor user ID stored in the storage, transmitting a print command and the image identification information that is stored in the storage in association with the information-processor user ID coincident with the printer user ID, to the printer via the communication unit, the print command instructing the printer to perform the printing operation based on the image data identified by the image identification information associated with the information-processor user ID coincident with the printer user ID, wherein the controller is configured to:
determine whether to add particular information;
when determining to add the particular information, add the particular information to the image data and transmit the image data with the added particular information to the printer via the communication unit; and
when determining not to add the particular information, transmit the image data, without adding the particular information, to the printer via the communication unit.

9. The information processing apparatus according to claim 8,
wherein the controller is configured to:
in response to receipt of the image identification information, periodically transmit the reply request to the printer via the communication unit; and
when determining that the printer user ID received from the printer as a reply to the periodically-transmitted reply request is coincident with the information-processor user ID stored in the storage, stop the periodic transmission of the reply request, and transmit the print command and the image identification information that is stored in the storage in association with the information-processor user ID coincident with the received printer user ID.

10. The information processing apparatus according to claim 8,
wherein the controller is configured to, when a number of non-coincidences exceeds a predetermined number of times, transmit a deletion command to the printer via the communication unit, and delete the image identification information from the storage, the deletion command instructing the printer to delete from the printer the image identification information and the image data corresponding to the image identification information, the number of non-coincidences representing a number of consecutive cases where a printer user ID received from the printer as a reply to each repeatedly-transmitted reply request is not coincident with any user ID stored in the storage.

11. The information processing apparatus according to claim 10, further comprising a notification unit,
wherein the controller is configured to, when deleting the image identification information from the storage before transmitting the print command and the image identification information to the printer, control the notification unit to provide a notification that the print command has been canceled.

12. The information processing apparatus according to claim 8,
wherein the controller is configured to, when the printer user ID is not received from the printer as a reply to the reply request, delete the image identification information from the storage.

13. The information processing apparatus according to claim 8,
wherein the controller is configured to, after transmitting the image data to the printer and before receiving the image identification information identifying the transmitted image data from the printer, accept another input print instruction via the operation unit.

14. The information processing apparatus according to claim 8, wherein the controller is configured to:
when determining not to add the particular information, add a print command to the image data and transmit the image data with the print command to the printer via the communication unit.

* * * * *